United States Patent [19]

Bannon

[11] Patent Number: 4,484,983

[45] Date of Patent: Nov. 27, 1984

[54] DISTILLATION AND VAPOR TREATMENT PROCESS

[75] Inventor: Robert P. Bannon, Houston, Tex.

[73] Assignee: Shell Oil Company, Houston, Tex.

[21] Appl. No.: 497,373

[22] Filed: May 23, 1983

[51] Int. Cl.$^3$ ............................................. B01D 3/14
[52] U.S. Cl. ...................................... 203/42; 203/39; 203/87; 203/98; 208/349; 208/368; 208/369; 202/185 A
[58] Field of Search ............... 208/368, 369, 358, 357, 208/342, 348, 349; 203/87, 42, 39, 98, 94, DIG. 9; 202/186, 185 A, 183, 184, 182; 196/99, 140; 62/17, 29

[56] References Cited

U.S. PATENT DOCUMENTS

| | | | |
|---|---|---|---|
| 2,398,396 | 4/1946 | Powell | 203/87 |
| 2,915,462 | 12/1959 | Salmon | 202/185 A |
| 3,039,941 | 6/1962 | Sweeney et al. | 203/87 |
| 3,320,159 | 5/1967 | Potts | 203/87 |
| 3,401,093 | 9/1968 | Cox | 203/87 |
| 3,427,228 | 2/1969 | Constantikes et al. | 203/87 |
| 3,493,470 | 2/1970 | Irvin | 203/87 |
| 3,824,177 | 7/1974 | Honerkamp et al. | 203/42 |
| 4,235,706 | 11/1980 | Bannon | 203/87 |

Primary Examiner—Wilbur Bascomb
Attorney, Agent, or Firm—Albert J. Adamcik

[57] ABSTRACT

A process for the distillation and condensation of a multi-component liquid is described, the process being characterized by the contacting of a warm portion of the overhead vapor with a cool liquid portion of the overhead to achieve a higher accumulator liquid temperature. In a principal embodiment, a multi-component liquid is distilled, the overhead vapor is separated into major and minor portions, and the bulk of the major portion is condensed. Liquid is separated from the remaining vapor of the major portion, and the separated liquid is divided into major and minor fractions. The major fraction of liquid is collected in an accumulation zone, and is contacted in the accumulation zone with at least the bulk of the minor portion of overhead vapor. Vapor from the accumulation zone is contacted with the minor fraction of liquid in a contacting zone.

8 Claims, 2 Drawing Figures

DISTILLATION AND VAPOR TREATMENT PROCESS

BACKGROUND OF THE INVENTION

Rapid escalation of energy costs in recent years has spurred efforts to improve efficiency in plant operations. Distillation practices have received great attention, since the process of distillation, the predominant unit operation in the oil refining and chemical industries, consumes prodigious amounts of energy.

One energy-saving procedure is the practice of multiple stage, e.g., two-stage, condensation of the overhead vapors from a distillation column. Multi-stage condensation procedures allow energy savings by permitting the use of higher temperature at which heat may be removed from the overhead vapor. Such a process is described, for example, in U.S. Pat. No. 3,320,159. In at least one two-stage procedure for condensation of distillation column overhead vapors, the first stage of condensation is operated under conditions to condense just enough liquid to provide reflux for the distillation column, and the second stage of condensation is operated under conditions to provide the top product of the column. For two-stage condensation to be of value in heat recovery, the vapor or top product from the distillation column must be a multi-component mixture, and there must be a reasonable temperature spread between its dew point and bubble point, e.g., 20 degrees F. Most hydrocarbon distillations fit this requirement.

A very common commercial process for which two-stage condensation can be helpful is the separation of gasoline boiling range materials (often 400° to 430° F. ASTM end point) as the top product from a feed containing also kerosene, jet fuel, distillate fuel and gas oil components. Two-stage condensation procedures, however, have the disadvantages of added capital cost and increased complexity. In general, the process, as known, has required the use of two accumulators, with interconnecting piping, pumps, etc. U.S. Pat. No. 4,235,706, issued Nov. 25, 1980, and incorporated herein by reference, describes an improved process for distillation and multi-stage condensation of a multicomponent vapor, the process being characterized by the integration and utilization of a unique accumulation zone, thereby providing effective reflux and reduced capital costs.

In the typical distillation column, the operating pressure is set so that overhead vapor may be condensed with the available cooling medium, usually cooling water or air. Normally, it is advantageous to keep the pressure as low as possible to increase the relative volatility of the feed components and thus lessen the reflux required for a given separation. As a consequence, the top product from the column is relatively cool; typically, only 20°–40° F. above the temperature of the cooling medium. If this product must be further processed at a higher temperature, for example, by further distillation, it must be reheated. The present invention seeks to conserve energy present in the vapor fraction from the distillation, and thereby reduce the overall energy consumption of the procedure.

SUMMARY OF THE INVENTION

Accordingly, the invention is, in one embodiment, a process comprising, (a) distilling a multi-component liquid in a distillation column under conditions effective to provide an overhead condensable vapor;

(b) separating the overhead condensable vapor into a major portion and a minor portion;

(c) condensing the bulk of the major portion in a condensation zone, and producing a condensation zone effluent comprising liquid or vapor and liquid;

(d) if vapor is present, separating vapor and liquid of said condensation zone effluent in a separation zone;

(e) separating liquid from the condensation zone effluent into major and minor fractions;

(f) passing minor fraction to a contacting zone and major fraction to an accumulation zone;

(g) contacting major fraction in the accumulation zone with at least the bulk of the minor portion of said condensable vapor;

(h) transferring vapor from said accumulation zone, and distilling transferred vapor in said contacting zone to provide a second liquid composition, and collecting second liquid composition in the accumulation zone.

If vapor is separated in step (d), it may be sent to the contacting zone, or may be forwarded on for recovery or further treatment.

In a preferred embodiment, the invention relates to a process comprising, (a) distilling a multi-component liquid in a distillation column under conditions effective to provide an overhead vapor fraction having a temperature differential of at least 20° F. between its dew point and its bubble point;

(b) condensing a portion of the overhead fraction in a first condensation zone having at least one condensation stage, and producing liquid condensate and partially cooled vapor;

(c) passing liquid condensate to an accumulation zone, and separating partially cooled vapor from step (b) into a major portion and a minor portion;

(d) condensing at least the bulk of the major portion in a second condensation zone having at least one condensation stage, and producing a second condensation zone effluent comprising liquid or vapor and liquid;

(e) if vapor is present, separating vapor and liquid of said condensation zone effluent in a separation zone;

(f) separating liquid from the condensation zone effluent into major and minor fractions;

(g) passing minor fraction to a contacting zone and major fraction to an accumulation zone;

(h) contacting major fraction in the accumulation zone with at least the bulk of the minor portion of said partially cooled vapor;

(i) transferring vapor from said accumulation zone, and distilling transferred vapor in said contacting zone to provide a liquid composition, and collecting liquid composition in the accumulation zone.

As in the first embodiment, if vapor is separated in step (e), it may be sent to the contacting zone, or may be forwarded on for recovery or further treatment. In this embodiment, the accumulation zone preferably capitalizes on techniques derived from my aforementioned patent. A three section accumulation zone is preferred, as more fully described hereinafter.

The liquid condensed may be collected in or after all, or fewer than all, of the condensation stages employed.

As used herein, the term "condensation stage" or "stages", or variants thereof, refers to units or apparatus, individually or collectively, employed in converting vaporous material, under suitable conditions of temperature and pressure, to liquid. Collected liquids may be individually or collectively passed to one or more accumulation zones, each zone having a number of sections separated by barriers. The number of sections is equal to or less than the number of liquids passed to the particular accumulation zone. The precise volume of vapor separated as a minor portion will depend on the many variables of the process, and may be determined by those skilled in the art. The key, as discussed further hereinafter, is the maximization of the heat content of the liquid fraction collected in the accumulation zone. Similarly, the volume of the portion of the overhead fraction to be condensed will depend, inter alia, on the temperature level desired in the accumulator.

The invention may be applied to any liquid suitable for distillation and multi- or two-stage condensation. For example, the invention may be employed in crude oil distillation processes, and in distillation of products from conversion processes such as catalytic cracking, hydrocracking, and delayed coking. The invention is preferably utilized in distillation processes in which the top product separated is a gasoline fraction. In the case where the top product is a multi-component mixture, there should be a reasonable temperature differential, say at least 20° F., preferably from 20° F. to 225° F., between its dew point and bubble point. However, the invention is also applicable to separations of substantially pure product, such as the separation of isopentane from n-pentane. In such cases, no substantial advantage accrues from the use of the procedure of the second embodiment as compared to the use of the procedures of the first embodiment. The particular conditions applied, i.e., pressure, temperature, throughput, etc., are those applicable to multi-or two-stage condensation, and are well understood by those skilled in the art. In any event, the salient feature of the invention is the use of a portion of the overhead vapor to enhance heat content of the liquid in the effluent from the condensation zone(s). By utilizing the heat of this minor portion, additional processing steps on the product, such as distillation, do not require as much heat input.

DETAILED DESCRIPTION OF THE INVENTION

In order to describe the invention in greater detail, reference is made to the accompanying schematic drawing.

Figure 1:
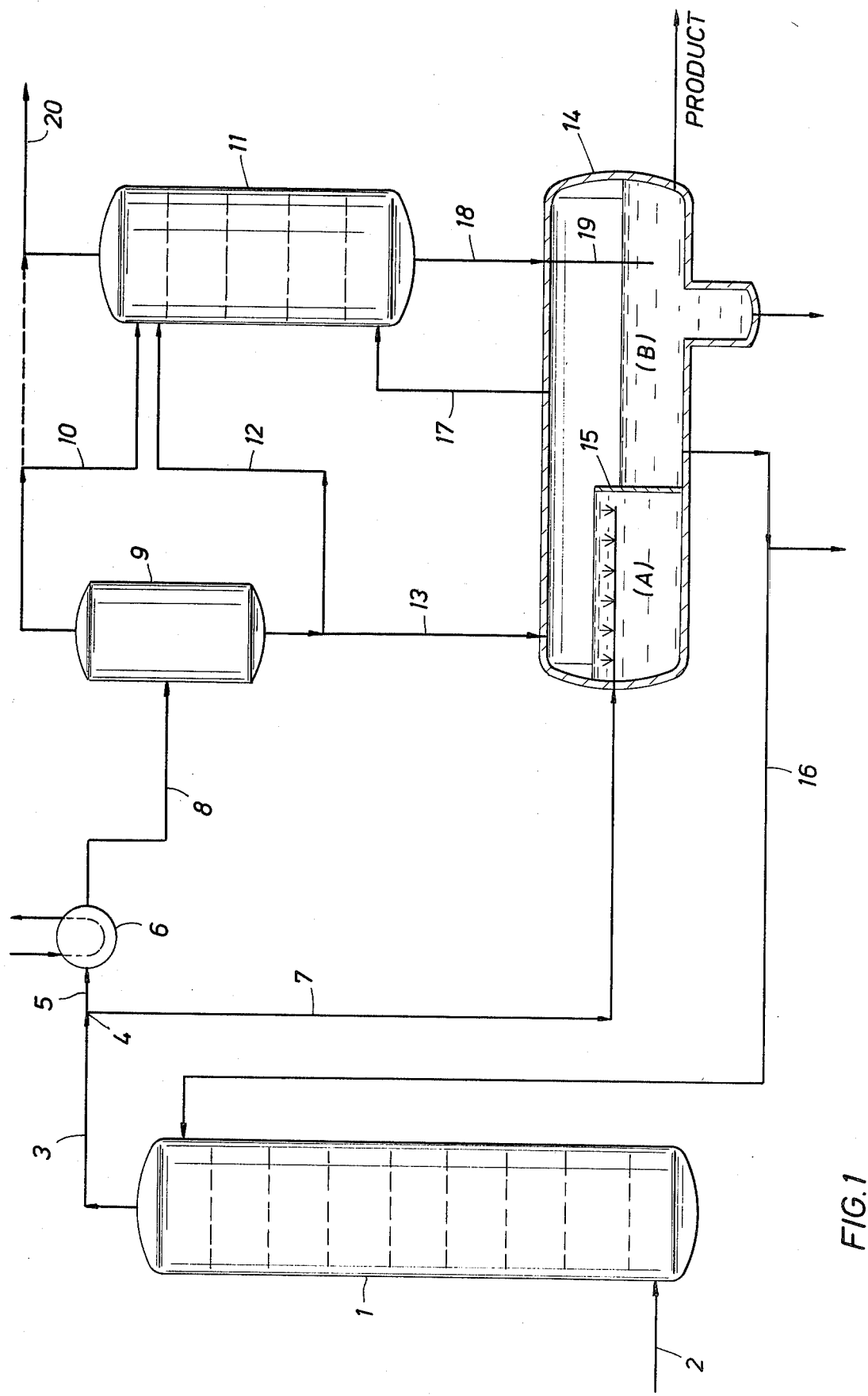

FIG. 1 illustrates the broad concept of the invention, while

Figure 2:
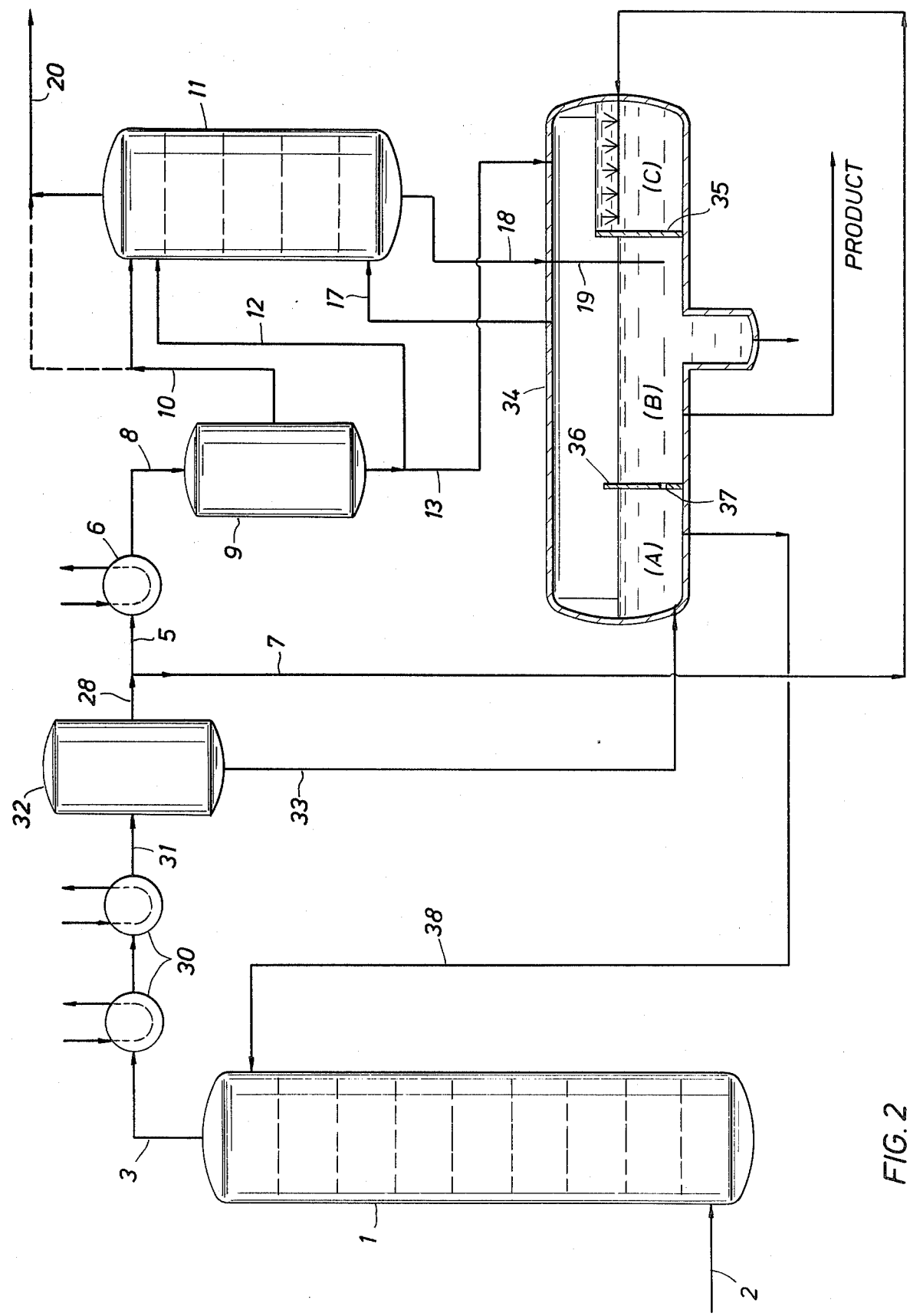

FIG. 2 illustrates the invention in conjunction with a multi-stage condensation procedure. All values mentioned are calculated or exemplary. Moreover, the invention will be described with use of a partitioned accumulation zone, although those skilled in the art will recognize that a non-partitioned zone may be employed. More particularly, numeral (1) designates a distillation column, preferably a fractionating column for a naphtha top product. The feed e.g., crude oil, enters column (1) through line (2), and is fractionated in a known fashion. Various draw-offs are provided (not shown), and overhead vapor exits column (1) through line (3) at a temperature of about 340° F. The overhead vapor is divided at (4) into major and minor portions, the major portion proceeding through line (5) to condenser (6). A minor portion, in this case about 10 percent by weight, based on the total weight of the overhead fraction, is removed via line (7), a more fully discussed hereinafter.

In condenser (6) the bulk of the major portion is condensed. For purposes of this illustration, the overhead is assumed to have a condensation range of about 200° F., e.g., to condense between about 340° F. and 140° F. at column operating pressure. The amount condensed is that sufficient to provide reflux for column (1) and adequate product recovery. Those skilled in the art may readily determine the amount to be condensed to satisfy these requirements. Any suitable type of condenser or heat exchange system may be employed, as will also be evident to those skilled in the art. Preferably, the vapor may be partially condensed, either by indirect heat exchange with another process stream, by air cooling, or by direct contact with condensate that has been cooled by exchange.

From unit (6), the vapor-liquid stream is passed through line (8) to the separator (9). In separator (9) vapor and liquid are separated, vapor either being passed overhead (dotted line) or being forwarded via line (10) to a contactor (11). Unit (6) may also be operated as a total condenser in which case the stream in line (8) is all liquid and there is no vapor flow from separator (9). A minor portion of liquid [say 10 percent by weight, based on the total weight of liquid condensed in unit (6)] is forwarded via line (12) to contactor (11), the remainder passing via line (13) to an accumulation zone (14). The external design of accumulating zone (14) may vary considerably, but preferably the accumulation zone is provided with a barrier(15) which divides the zone into two separate liquid-containing sections. At the same time, barrier (15) is constructed so that it does not limit vapor flow in accumulating zone (14). Accordingly, the liquid stream in line (13) enters accumulating section (A) formed by the walls of unit (14) and barrier (15). If a second liquid phase is likely to be present, such as water, barrier (15) should be constructed so that the lower phase does not accumulate. Alternatively, a separate drawoff can be provided for lower phase from accumulation section (A). The minor portion of vapor, in line (7), is fed to section (A) of accumulator (14) by means of sparging devices. Therein, by means of the sparging devices, the vapor exchanges heat with the liquid in section (A), raising the temperature thereof to about 160° F. Vapor is free to occupy the entire open volume of unit (14). Liquid from section (A) may overflow barrier (15) to section (B) of unit (14), and reflux is returned via line (16) to column (1). Product may also be removed via line (16), or may be removed separately from accumulation zone (14).

Vapor from zone (14) is passed through line (17) to vent contactor (11). Contactor (11) serves to absorb and condense additional components from the vapor in lines (10) and (17). Contactor (11) may be of any suitable type, but is preferably a small tray contactor having, e.g., 3 to 5 trays. The vapor leaving contactor (11) suitably has a temperature only slightly higher than the liquid feed to the contactor. As illustrated, the liquid recovered in contactor (11) i.e., condensate, passes or flows to, and collects, via line (18), in the accumulating section (B) of zone (14) through a sealed dip leg (19) to counterbalance the pressure drop of vapor flowing between accumulation zone (14) and contactor (11). Any "non-condensables" from vent contactor (11) may be processed by conventional techniques via line (20).

While a minor portion of the vapor in the open space above section (B) will condense, such condensation is not of major significance.

In FIG. 2, similar numbers represent similar features. As illustrated, the procedure of FIG. 2 employs the accumulator or accumulation techniques of my aforementioned patent, although this is not critical, and adds a third section in the accumulator. Accordingly, the feed enters column (1) through line (2), and is fractionated in a manner known to those skilled art. The overhead vapor fraction in line (3), at a temperature of about 380° F. (hotter than for FIG. 1 because of staged condensing) is condensed in condensation zone (30), preferably in a series of condensation stages. For example, condensation zone (30) may comprise shell and tube heat exchangers wherein a colder process stream is heated. Preferably, the overhead fraction is cooled to about 340° F., thus providing sufficient condensate to reflux column (1). Those skilled in the art may readily determine the amount to be condensed for adequate reflux of the distillation column. From the last stage, a liquid vapor stream is forwarded via line (31) to separation zone (32) where vapor and liquid are separated. Separation zone (32) may comprise merely an enlarged section of line, a centrifugal separator, or other well-known means for separating vapor and liquid. Separation zone (32) may be incorporated into the last condensation stage. Liquid is removed from zone (32) via line (33), and is forwarded to accumulator (34). Accumulator (34) may vary considerably in external design, but follows generally the principles describe in U.S. Pat. No. 4,235,706. More particularly, accumulator (34) is provided with barriers (35) and (36) which divide the accumulator into three separate liquid-containing sections, there being only limited liquid communication between the sections, as will be illustrated later. At the same time, barriers (35) and (36) are constructed so that they do not limit vapor flow in accumulating zone (34). Accordingly, the liquid stream in line (33) enters accumulating zone (34), as shown, where it settles in accumulation section (A) formed by the walls of unit (34) and barrier (36). Vapor may occupy the entire open volume of unit (34). The temperature of liquid in section (A) will be about 340° F. Liquid from section (A) may be returned via line (37) to column (1) to provide the reflux mentioned previously. Vapor from zone (34) may be passed through line (17) to vent contactor (11).

Concomitantly, the vapor removed in separator (32) is divided, in line (28) into major and minor portions. The major portion proceeds to condensation zone (6) via line (5). A minor portion, which represents about 10 percent of the total vapor, is removed via line (7), a more fully discussed hereinafter.

In condensation zone (6) the bulk of the major portion is condensed. For purposes of this illustration, the vapor to condensation zone (6) is assumed to have a condensation range of about 200° F., i.e., to condense between about 340° F. and 140° F. at column operating pressure. The amount condensed is approximately equal to the top product flow while at the same time providing for enhanced heat recovery of the energy utilized in the distillation. Condensation units and techniques similar to those illustrated in connection with FIG. 1 may be employed, as will be evident to those skilled in the art.

From zone (6), the vapor-liquid stream is passed through line (8) to separation zone (9). As discussed in relation to FIG. 1, vapor and liquid are separated in separator(9), vapor being passed overhead (dotted line) or forwarded via line (10) to contactor (11). As also discussed, the stream from condenser (6) may be all liquid and vapor flow in line (10) would then be zero. A minor portion of liquid [10 percent by weight, based on the total weight of liquid condensed in unit (6)] is forwarded via line (12) to contactor (11), the remainder passing via line (13) to section (C) of accumulation zone (34). Liquid from (13) accumulates in section (C), and liquid from (18) and (19) collects in section (B). Vapor in line (7) is forwarded to section (C) of accumulator (34), where it is sparged into the liquid. Barrier (35) functions in a manner similar to that of barrier (15) in FIG. (1). The barrier (36) separating zone (34) into sections (A) and (B) is limited so that the sections have open vapor communication to allow vapor flow and pressure equalization between the sections. Preferably, barrier (36) is provided further with an opening (37) near or at the bottom thereof, as described in my aforementioned patent, for liquid level balance and for flow of heavy second liquid phase to a boot for separate drawoff. The size of the opening is determined by the volumes of liquid to be balanced, keeping in mind that significant mixing of the liquids in sections (A) and (B) is not desired. The "opening" may, as will be understood by those skilled in the art, be a multiplicity of smaller openings, the total cross-sectional area of the openings being such as to fulfill the requirements noted. Barrier (36) may be constructed of any suitable impermeable material, such as steel or ceramic, and the opening (if present) should be baffled to prevent convection flow.

As will be recognized by those skilled in the art, the key to the invention is the contacting of a cool liquid portion of the overhead with the warmer vapor portion of the overhead. This permits operation of the product-containing sections of the accumulator at a higher temperature, and less heat will be required for further processing of the top-product.

The detailed description exemplifies a column overhead vapor composed of a mixture of compounds of differing boiling points, so that there is a temperature spread between the bubble and dew points of the mixture. The invention is most advantageously applied to such a mixture, particularly in the arrangement of FIG. 2. However, it is also useful, as noted, for the distillation of mixtures producing pure or nearly pure compound as top product. It is not practical to operate the condenser of such a column to produce liquid product at its bubble point without loss of some product as vapor. Therefore, out of practical necessity, condensers of such columns are operated to subcool the product to prevent this loss of vapor. Use of this invention will allow the reheating of product to the bubble point without vapor loss.

What is claimed is:

1. A process comprising
  (a) distilling a multi-component liquid in a distillation column under conditions effective to provide an overhead condensable vapor;
  (b) separating the overhead condensable vapor into a major portion and a minor portion;
  (c) condensing the bulk of a major portion in a condensation zone, and producing a condensation zone effluent comprising vapor and liquid;
  (d) removing condensation zone effluent from the condensation zone and separating the vapor and the liquid of said condensation zone effluent in a separation zone;

(e) separating liquid from the separation zone into major and minor fractions;

(f) passing the minor fraction of liquid from step (e) to a contacting zone and the major fraction of liquid from step (e) to an accumulation zone;

(g) contacting the major fraction of liquid from step (e) in the accumulation zone with at least the bulk of the minor portion of said condensable vapor from step (b);

(h) transferring vapor from said accumulation zone to said contacting zone, and contacting transferred vapor in said contacting zone with the minor fraction of liquid from step (e) to provide a liquid composition, and collecting liquid composition in the accumulation zone.

2. A process comprising
(a) distilling a multi-component liquid in a distillation column under conditions effective to provide an overhead vapor fraction having a temperature differential of at least 20° F. between its dew point and its bubble point;
(b) separating the overhead fraction into a major portion and a minor portion;
(c) condensing the bulk of the major portion in a condensation zone, and producing a condensation zone effluent comprising vapor and liquid;
(d) removing the condensation zone effluent from the condensation zone and separating the vapor and the liquid of said condensation zone effluent in a separation zone;
(e) separating liquid from the separation zone into major and minor fractions;
(f) passing the minor fraction of liquid from step (e) to a contacting zone and the major fraction of liquid from step (e) to an accumulation zone;
(g) contacting the major fraction of liquid from step (e) in the accumulation zone with at least the bulk of the minor portion of said overhead fraction form step (b);
(h) transferring vapor from said accumulation zone to said contacting zone, and contacting transferred vapor in said contacting zone with the minor fraction of liquid from step (e) to provide a liquid composition, and collecting the liquid composition in the accumulation zone.

3. A process comprising
(a) distilling a multi-component liquid in a distillation column under conditions effective to provide an overhead vapor fraction having a temperature differential of at least 20° F. between its dew point and its bubble point;
(b) condensing a portion of the overhead vapor fraction in a first condensation zone having at least one condensation stage, and producing liquid condensate and partially cooled vapor;
(c) passing the liquid condensate from step (b) to an accumulation zone, and separating the partially cooled vapor from step (b) into a major portion and a minor portion;
(d) condensing the bulk of the major portion of partially cooled vapor from step (c) in a second condensation zone having at least one condensation stage, and producing a second condensation zone effluent comprising vapor and liquid;
(e) removing the second condensation zone effluent from the second condensation zone and separating the vapor and the light of said second condensation zone effluent in a separation zone;

(f) separating the liquid from the separation zone into major and minor fractions;

(g) passing the minor fraction of liquid from step (f) to a contacting zone and the major fraction of liquid from step (f) to an accumulation zone;

(h) contacting the major fraction of liquid from step (f) in the accumulation zone with at least the bulk of the minor portion of said partially cooled vapor from step (c);

(i) transferring vapor from said accumulation zone to said contacting zone, and contacting transferred vapor in said contacting zone with the minor fraction of liquid from step (f) to provide a liquid composition, and collecting the liquid composition in the accumulation zone.

4. The process of claim 3 wherein the accumulation zone comprises a first accumulation section, a second accumulation section and a third accumulation section, all having vapor communication, the second accumulation section being separated from first accumulation section by a barrier which provides limited flow of liquids between the first accumulation section and the second accumulation section, the first and second accumulation sections being at different liquid temperatures, the second and third accumulation sections being separated by a barrier permitting overflow of liquid from the third accumulation section to the second accumulation section, and wherein reflux liquid is returned to the column from the first accumulation section, partially cooled vapor is sent to the third accumulation section, the major fraction of liquid from the separation zone is sent to the second accumulation section, and vapor from the accumulation sections is passed to the contacting zone.

5. A process comprising
(a) distilling a multi-component liquid in a distillation column under conditions effective to provide an overhead condensable vapor;
(b) separating the overhead condensable vapor into a major portion and a minor portion;
(c) condensing the major portion in a condensation zone, and producing a liquid condensation zone effluent;
(d) separating the liquid condensation zone effluent into major and minor fractions of liquid;
(e) passing the minor fraction of liquid from step (d) to a contacting zone and the major fraction of liquid from step (d) to an accumulation zone;
(f) contacting the major fraction of liquid from step (d) in the accumulation zone with at least the bulk of the minor portion of said overhead condensable vapor from step (b);
(g) transferring vapor from said accumulation zone to said contacting zone, and contacting transferred vapor in said contacting zone with the minor fraction of liquid from step (d) to provide a liquid composition, and collecting the liquid composition in the accumulation zone.

6. A process comprising
(a) distilling a multi-component liquid in a distillation column under conditions effective to provide an overhead vapor fraction having a temperature differential of at least 20° F. between its dew point and its bubble point;
(b) separating the overhead vapor fraction into major portion and a minor portion;

(c) condensing the major portion in a condensation zone, and producing a liquid condensation zone effluent;

(d) separating the liquid condensation zone effluent into major and minor fractions of liquid;

(e) passing the minor fraction of liquid from step (d) to a contacting zone and the major fraction of liquid from step (d) to an accumulation zone;

(f) contacting the major fraction of liquid from step (d) in the accumulation zone with at least the bulk of the minor portion of said overhead vapor fraction from step (b);

(g) transferring vapor from said accumulation zone to said contacting zone, and contacting transferred vapor in said contacting zone with the minor fraction of liquid from step (d) to provide a liquid composition, and collecting the liquid composition in the accumulation zone.

7. A process comprising (a) distilling a multi-component liquid in a distillation column under conditions effective to provide an overhead vapor fraction having a temperature differential of at least 20° F. between its dew point and its bubble point;

(b) condensing a portion of the overhead vapor fraction in a first condensation zone having at least one condensation stage, and producing liquid condensate and partially cooled vapor;

(c) separating the liquid condensate from the partially cooled vapor;

(d) passing liquid condensate separated in step (c) to an accumulation zone, and separating the partially cooled vapor from step (c) into a major portion and a minor portion;

(e) condensing the major portion of partially cooled vapor from step (d) in a second condensation zone having at least one condensation stage, and producing a liquid second condensation zone effluent;

(f) separating the liquid second condensation zone effluent into major and minor fractions of liquid;

(g) passing the minor fraction of liquid from step (f) to a contacting zone and major fraction of liquid from step (f) to an accumulation zone;

(h) contacting the major fraction of liquid from step (f) in the accumulation zone with at least the bulk of the minor portion of said partially cooled vapor from step (d);

(i) transferring vapor from said accumulation zone to said contacting zone, and contacting transferred vapor in said contacting zone with the minor fraction of liquid from step (f) to provide a liquid composition, and collecting the liquid composition in the accumulation zone.

8. The process of claim 7 wherein the accumlation zone comprises a first accumulation section, a second accumulation section, and a third accumulation section, all having vapor communication, the second accumulation section being separated from first accumulation section by a barrier which provides limited flow of liquids between the first accumulation section and the second accumulation section, the first and second accumulation sections being at different liquid temperatures, the second and third accumulation sections being separated by a barrier permitting overflow of liquid from the third accumulation section to the second accumulation section, and wherein reflux liquid is returned to the column from the first accumulation section, partially cooled vapor is sent to the third accumulation section, the major fraction of liquid from step (e) is sent to the second accumulation section, and vapor from the accumulation sections is passed to the contacting zone.

* * * * *